United States Patent [19]

Niconchuk

[11] 4,435,470

[45] Mar. 6, 1984

[54] REPAIR MATERIAL FOR TUBELESS TIRES

[75] Inventor: Alec W. Niconchuk, Peabody, Mass.

[73] Assignee: North Shore Laboratories Corporation, Peabody, Mass.

[21] Appl. No.: 367,462

[22] Filed: Apr. 12, 1982

[51] Int. Cl.³ .............................................. B32B 31/00
[52] U.S. Cl. ..................................... 428/294; 156/95; 156/97; 152/359; 152/367; 152/370
[58] Field of Search ............ 428/294, 295, 343, 40–42; 156/95, 97; 152/359, 367, 370, 371

[56] References Cited

U.S. PATENT DOCUMENTS

| 2,031,960 | 2/1966 | Kempel | 428/343 |
| 2,333,699 | 11/1943 | Brosi | 428/295 |
| 2,803,284 | 8/1957 | Mullen | 156/97 X |
| 3,049,164 | 8/1962 | Humphreys et al. | 156/97 X |
| 3,172,446 | 3/1965 | Gruber | 152/370 |
| 3,277,642 | 10/1966 | Niconchuk | 156/97 X |
| 3,282,320 | 11/1966 | Klouza | 152/370 |
| 3,919,021 | 11/1975 | Whittle | 156/97 |
| 3,936,550 | 2/1976 | Carlson et al. | 428/295 |
| 4,017,654 | 4/1977 | Evans et al. | 428/40 |

FOREIGN PATENT DOCUMENTS 1938711 5/1970 Fed. Rep. of Germany ...... 428/295

Primary Examiner—George F. Lesmes
Assistant Examiner—Nancy A. B. Swisher
Attorney, Agent, or Firm—Robert B. Russell

[57] ABSTRACT

Material for repairing punctures in tubeless tires from the outside is provided employing a multiplicity of substantially contiguous, lightly twisted fibrous cords which are heavily coated and at least partially impregnated with a highly plasticized and essentially weak, vulcanized elastomeric adhesive, the cords lying abreast and between a pair of release sheets, whereby the cords are encased in adhesive and can be peeled off the release sheets and separated as needed to repair various sized punctures.

8 Claims, 5 Drawing Figures

REPAIR MATERIAL FOR TUBELESS TIRES

FIELD OF THE INVENTION

This invention relates to materials for repairing tubeless tires and more particularly to materials for repairing punctures from the outside of a tire without deflating same or removing it from the wheel on which it is mounted. Still more particularly the invention relates to what are called "string" or "cord" repairs comprising an elongated fibrous body impregnated with an elastomeric adhesive which is inserted into the puncture from the outside by the use of a suitable applicator tool.

BACKGROUND OF THE INVENTION

In order to produce a truly effective string or cord repair (we will refer to it only as a cord repair), a number of conditions must be met. First, the cord must have enough body adequately to fill the cut or puncture being repaired. Second, the cord body must be sufficiently limp and pliable to adapt itself to the shape of the puncture but yet still be strong enough to withstand the stress of being jammed into the puncture by the applicator tool. Third, the adhesive which impregnates the cord must be sufficiently distributed throughout the puncture and the fibrous body to prevent air leakage at any point. A fourth requirement is that there be no free path of air to seep through the core of the cord (where the adhesive may not have fully penetrated) from inside the tire to the outside. A fifth requirement is that the adhesive must be insoluble in oils or gasoline to which the tire may be subjected in normal use. Also the adhesive must not be free to migrate under normal conditions of heat and stress encountered in use, but yet the adhesive must be capable of adapting to the shape of the puncture as well as achieving intimate and complete adhesion with the walls of the entire puncture.

These criteria are difficult to meet simultaneously. Thus, if a sufficiently strong fibrous body is provided to withstand the stress of insertion, the matting of the fibers thereof not only renders thorough impregnation with adhesive extremely difficult but also tends to make the body relatively stiff so as not to yield into conformance with the shape of the puncture. Also, if a non-vulcanizable elastomer is used which is capable of migrating so as to fill the entire puncture, the elastomer will thereafter be washed out by oil or gasoline rendering the repair ineffective. Conversely, if a vulcanizable elastomer is employed it must be vulcanized or else it too will wash out, but if it is vulcanized, then it will tend not to yield completely to fill the puncture, especially if the puncture has an odd shape.

Another problem with cord repairs is that the size and shape of punctures cannot be predicted. One way previously used to deal with this problem has been to use a reaming tool so as to increase the size of small punctures to a larger, standard sized hole suitable for a given large sized cord. Such reaming, however, ruptures the reinforcing within the tire and is generally undesireable. Repairing still larger sized cuts or punctures by using several cord repairs placed side-by-side in the puncture has been attempted, but it is considered risky because the adjacent previously vulcanized cords are not intimately adhered to each other.

It is, therefore, a general objective of this invention to provide cord repair material which satisfies the foregoing criteria and effectively deals with each of the problems arising therefrom. More specifically it is an object of the invention to provide a cord repair material which can repair punctures of a wide range of sizes and shapes and do so without at the same time requiring any reaming for small holes. Another object is to provide a strong cord body but yet to combine it with a vulcanized elastomer in such a way that no seepage of air can take place through the core of the cord. Still another object is to provide a vulcanized elastomer for such a cord, which elastomer, although vulcanized, can yield sufficiently completely to fill punctures of any shape.

BRIEF DESCRIPTION OF THE INVENTION

These and other objects of the invention in a preferred embodiment thereof are accomplished by employing a multiplicity of parallel twisted cords coating same with a large quantity (i.e., 175% to 300% of the weight of fiber) of a highly plasticized vulcanizable elastomeric adhesive, vulcanizing the adhesive, and packaging the cords in release paper or film. The size of the cords is selected so that a single cord is suitable for repairing a given minimum sized puncture. Larger sized punctures are repaired by simultaneously peeling off of the release paper two or more of the parallel cords and inserting a suitably sized group into the puncture. The adhesive is vulcanized while the cords are lying generally contiguously, and, as a result, groups of the cords are already permanently adhered to each other prior to insertion into a large puncture. This renders effective the use of a multiplicity of the cords. On the other hand, although the adhesive is vulcanized, (and hence "permanently" set), it is so highly plasticized that it is extremely pliable and essentially weak. This is important for several reasons. First, it permits the cords to be peeled off either individually or simultaneously in groups. Secondly, it permits the cords to adapt to the configuration of the puncture and the elastomer to squeeze fully into punctures of various sizes and of any shape, but yet not to migrate or wash out, due to the vulcanization. It is a feature of the invention that even though a twisted cord (or composite of twisted yarns) is employed and total penetration of the elastomer into the core of individual yarns may not be achieved, no seepage of air through the repair through the core of the yarns can take place because the vulcanized elastomer completely surrounds the cord and yarns and the cord and yarns are placed into the puncture in the form of a loop in which the porous core is never exposed to the pressurized air inside the tire.

DESCRIPTION OF THE DRAWINGS

A preferred embodiment of the invention is illustrated in the accompanying drawings in which.

DETAILED DESCRIPTION OF THE INVENTION

Figure 1:
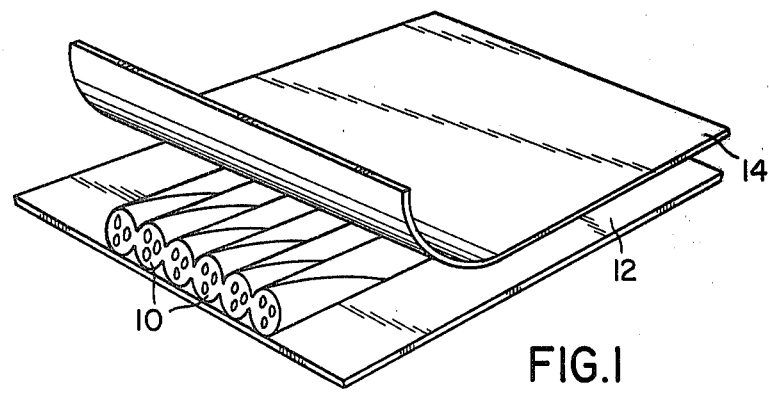
FIG. 1 is a view in perspective of six cords of the invention packaged side-by-side between two sheets of release paper, with one sheet shown peeled upwardly to expose the cords to view.
Figure 2:
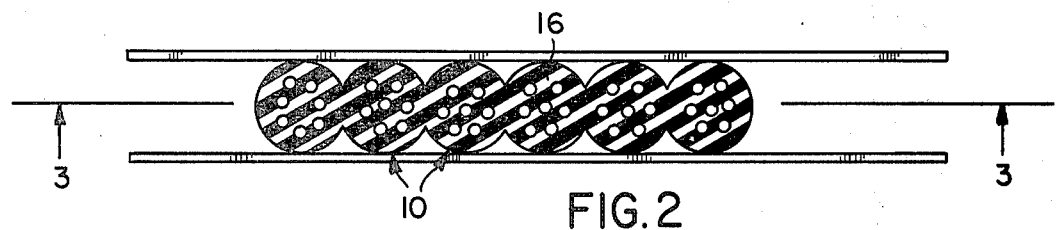
FIG. 2 is a cross sectional view in end elevation along the lines 2—2 of FIG. 1.
Figure 3:
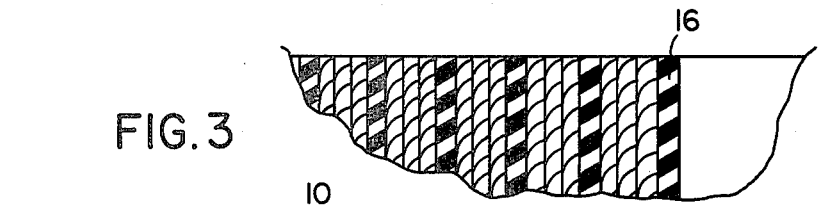
FIG. 3 is a fragmentary cross sectional plan view along the lines 3—3 of FIG. 2.

The preferred embodiment of the present invention selected for purposes of illustration and shown in the accompanying drawings comprises a series of parallel cords 10 six of which are shown in FIG. 1 lying side-by-side in a single plane between release sheets 12, 14. The cords 10 may comprise twisted natural or synthetic filamentary material including a multiplicity of smaller twisted yarns. Cotton is a suitable fiber. Synthetic fibers such as nylon or polyester in a very fine, twisted state can also be used. The amount of fiber used for each cord 10 depends upon the minimum sized puncture the material is intended to repair. Generally, a cord comprising seven ends of spun nylon yarn (3 ends twisted 2.35 twists per inch, 4 lbs=8000 ft.) twisted together at 1 twist per inch provides a useful size for the individual cords, 10 but using as few as three such yarns to make up a single code 10 is feasible for very small punctures and is advantageous.

The cords 10 and any subcomponent yarns are coated and at least partially impregnated with an elastomeric adhesive 16 in a ratio of over 175% elastomer based on weight of fiber. The adhesive is highly plasticized, as for example by the use of equal parts of natural rubber and pine oil together with suitable vulcanizing agents, or by the use of one part each of synthetic rubber (i.e., BUNa-S, BUNa-N), Coumaron-indene resin, and plasticizer (Dioctyl-phthalate), plus suitable vulcanizing agents. The exact formulation is not critical to the invention so long as the adhesive is both vulcanizable and so highly plasticized as to be extremely weak after vulcanization. The nature of its weakness can be expressed in terms of the force required to peel off and separate cords 10 after being vulcanized while sandwiched between release sheets 12, 14 in touching relation. A gross force of as low as 4 lbs. and as high as 20 lbs. is appropriate with the optimum between about 6 lbs. and 16 lbs.

Figure 5:
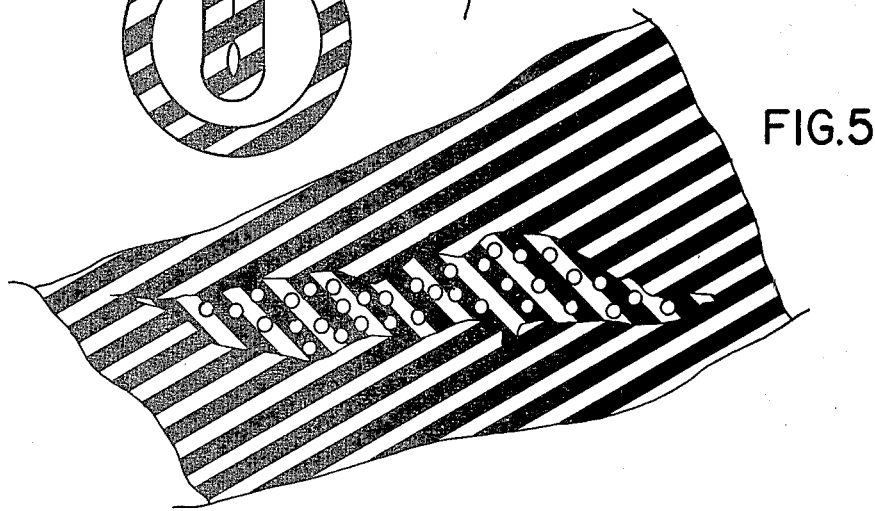

The very high proportion of vulcanized adhesive, the weakness of the adhesive, and the low number of twists per inch of the cords 10 cooperate to provide an extremely adaptable repair material which can accommodate any shape of puncture (see FIG. 5), and spread through a cut completely to seal it. In FIG. 5 these cords are shown filling a large puncture.

Figure 4:
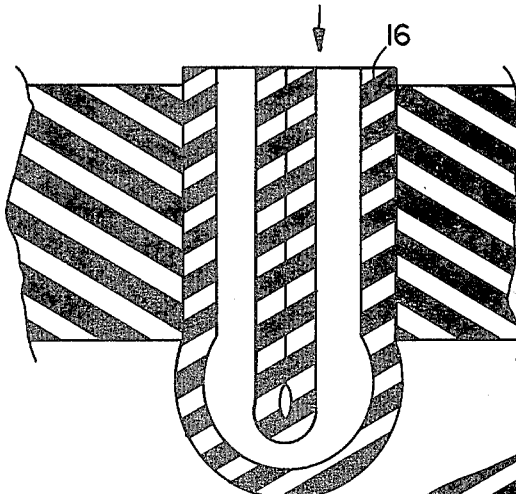
FIG. 4 is a cross sectional diagrammatic representation of a puncture and a single cord filling same; and, FIG. 5 is a diagrammatic plan view in cross section of an irregularly shaped puncture with three parallel cords filling same.

In addition, the vulcanization and high proportion of adhesive serve effectively to encase the yarns and cords 10 so that upon insertion (see FIG. 4), the body of the cord, where portions of the yarns may not be fully impregnated, is never exposed to the pressurized air within the tire and thereby seepage of the air out of the tire is prevented even though impregnation may not be perfect.

The weakness of the vulcanized adhesive, the looseness of the twist or cords 10 and the high proportion of adhesive also cooperate to make it feasible to employ groups of cords 10 in order to repair larger sized punctures than the designed minimum. In addition, by vulcanizing the adhesive in place while the cords 10 are lying adjacent to each other with respective adhesive coatings in a substantially contiguous relationship. The cords are joind by a vulcanized elastomeric connection. This means that they are permanently joined and will not move relative to each other in the tire. The adhesive, however, is sufficiently weak to permit the cords 10 to be peeled apart by hand. Such peeling breaks the adhesive connection, but only in the adhesive and does not expose the inner fibers of cords 10 where impregnation may not be complete. Thus, single cords 10 or groups can be used without problems. It is not necessary that the vulcanized adhesive connection between adjacent cords 10 be uniformly continuous along the length of cords 10, so long as there is substantial contact to form the vulcanized adhesive connection.

The material of release sheets 12, 14 can be parchment type paper, paper coated with a release layer, or any one of various types of plastic film such as polyethylene, teflon or the like.

The cords 10 are typically 3½" in length, but the length required depends on the tire being repaired. Truck tires require longer cords, typically 8" in length.

While the repair material of the invention has been shown as packaged 6 abreast in a single plane between the release sheets 12, 14, it is feasible to package and vulcanize more than one layer either parallel or in a criss-cross pattern. Also it is feasible to form the cords 10 with a large number (say 20) of parallel yarns in somewhat loose contacting relation, and to peel the so formed cords 10 apart to obtain repairs of any desired thickness.

Accordingly, since numerous further variations of the preferred embodiments herein shown will now be apparent to those skilled in the art, it is not intended to confine the invention to the precise form herein shown but rather to limit it in terms of the appended claims.

I claim:

1. Cord repair material for repairing tubeless tires from the outside comprising:
   (a) a multiplicity of individually twisted, parallel fibrous cords,
   (b) an elastomeric adhesive adhering to, fully coating, and at least partially impregnating each said cord in quantity over 175% by weight of fiber,
   (c) said adhesive comprising a highly plasticized, vulcanized, essentially weak elastomer, and
   (d) said cords lying substantially contiguous with the elastomer which coats adjacent cords vulcanized together, at least in places, whereby adjacent cords are joined by permanently set elastomer but can be peeled apart by rupturing the weak elastomeric connection therebetween.

2. The cord repair material defined in claim 1 further characterized by:
   (e) said multiplicity of cords being disposed in a single plane.

3. The cord repair material defined in claim 2 further characterized by:
   (i) the multiplicity of cords comprising six cords.

4. The cord repair material defined in claim 2 further characterized by:
   (f) a first release sheet and
   (g) said multiplicity of cords is superimposed on the first release sheet.

5. The cord repair material defined in claim 3 further characterized by:
   (h) a second release sheet overlying the multiplicity of cords and first release sheet.

6. The cord repair material defined in claim 1 further characterized by:
   (j) each cord of the multiplicity of cords comprises a multiplicity of smaller twisted years.

7. The cord repair material defined in claim 1 further characterized by
   the gross resistance to rupture of the vulcanized elastomeric connection being between about 2 and 20 lbs.

8. The cord repair material defined in claim 7 further characterized by
   the ratio by weight of adhesive to fiber being between 200% and 350%.

* * * * *